United States Patent
La Porta et al.

(10) Patent No.: US 9,864,152 B1
(45) Date of Patent: Jan. 9, 2018

(54) OPTICAL ASSEMBLY WITH OPTICAL COUPLER

(71) Applicant: International Business Machines Corporation, Armonk, NY (US)

(72) Inventors: Antonio La Porta, Kilchberg (CH); Gerd Schlottig, Uitikon Waldegg (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/267,358

(22) Filed: Sep. 16, 2016

(51) Int. Cl.
  *G02B 6/30* (2006.01)
  *G02B 6/42* (2006.01)
  *G02B 6/12* (2006.01)

(52) U.S. Cl.
  CPC ......... *G02B 6/423* (2013.01); *G02B 6/12004* (2013.01); *G02B 6/30* (2013.01); *G02B 6/4242* (2013.01); *G02B 6/4249* (2013.01)

(58) Field of Classification Search
  CPC ....... H01L 2924/00; H01L 2924/00014; H01L 2224/48091; G02B 6/4214; G02B 6/30
  See application file for complete search history.

(56) References Cited

U.S. PATENT DOCUMENTS

| | | | |
|---|---|---|---|
| 6,760,500 B2 | 7/2004 | Furuyama | |
| 6,786,654 B2 | 9/2004 | Kilian | |
| 6,827,505 B2 | 12/2004 | Shinde et al. | |
| 7,255,491 B2 | 8/2007 | Takagi | |
| 7,334,946 B2 * | 2/2008 | Lu | G02B 6/4206 385/52 |
| 9,494,741 B2 * | 11/2016 | Gardes | G02B 6/30 |
| 2004/0131318 A1 | 7/2004 | Mori et al. | |
| 2004/0252953 A1 | 12/2004 | Crane, Jr. et al. | |
| 2012/0177381 A1 | 7/2012 | Dobbelaere et al. | |

OTHER PUBLICATIONS

Velsher "Application-specific optoelectronic packaging." Electronic Components and Technology Conference, 2002. Proceedings. 52nd, pp. 794-800.

* cited by examiner

*Primary Examiner* — Jennifer Doan
(74) *Attorney, Agent, or Firm* — Cantor Colburn LLP; Daniel Morris

(57) ABSTRACT

The present invention is directed to an optical assembly that comprises a coupler and a connecting structure. The coupler comprises first optical waveguides, a male alignment feature and optical connection means. The first optical waveguides extend parallel from a first end to a second end and form a planar end portion at the level of the second end. The male alignment feature, to which said planar end portion is secured, protrudes transversally to an average plane of the planar end portion, at the level of said planar end portion. The optical connection means are arranged at the level of said first end. The connecting structure comprises second optical waveguides that extend parallel to said plane and a female alignment feature, which is configured to receive said male alignment feature, and extends transversally to said plane at the level of the planar end portion.

20 Claims, 7 Drawing Sheets

OPTICAL ASSEMBLY WITH OPTICAL COUPLER

BACKGROUND

The invention relates in general to the field of optical assemblies, optical devices, and, more generally, to solutions to connect an optical guiding element to the lid or encapsulation of an optical package.

Many optical coupling solutions are known. For example, US20120177381 (A1) discloses a solution relying on direct fiber interface or attaches to chip using optical coupling elements, which contain fibers or deflecting elements (e.g., mirrors, lenses) assembled onto a photonics die. An out-of-plane optical coupling is obtained, due to grating couplers on the photonics die.

In general, optical off-package connections are difficult because of the dimensions of the components and the force loads involved. For example, characteristic lengths of the components on die or within the package are typically less than 100 µm, while characteristic lengths outside the die/package are usually larger than 250 µm, which typically results in total lengths larger than 20 mm.

Using stiff parts to bridge the dimension gap bears the risk to introduce large levering forces into sensitive package parts, such as solder interconnects. If fiber tails extend over the package dimensions they bear the same risk. In addition, packaging processes are usually limited to some maximum sizes and cannot be implemented with a fiber tail footprint.

Using flexible parts to bridge the dimension gap poses other problems as such parts cannot be aligned to the inner part of the package after encapsulation. Indeed, after encapsulation, at least some of the parts are not accessible anymore and therefore their relative positions cannot be adjusted. Finally, encapsulation and lidding processes often require (high) temperatures that are incompatible with the optical components.

SUMMARY

According to a first aspect, the present invention is embodied as an optical assembly that comprises a coupler and a connecting structure. The coupler comprises first optical waveguides, a male alignment feature and optical connection means. The first optical waveguides extend parallel from a first end to a second end and form a planar end portion at the level of the second end. The male alignment feature, to which said planar end portion is secured, protrudes transversally to an average plane of the planar end portion, at the level of said planar end portion. The optical connection means are arranged at the level of said first end. The connecting structure comprises second optical waveguides that extend parallel to said plane and a female alignment feature, which is configured to receive said male alignment feature, and extends transversally to said plane at the level of the planar end portion. The optical connection means are configured to allow the first optical waveguides to be optically coupled to one or more optical devices at said first end. The connecting structure is designed so as to allow the first optical waveguides to be optically coupled, at said second end, to the second optical waveguides upon insertion of the male alignment feature into the female alignment feature.

In embodiments, the planar end portion is fixed to an end surface of the male alignment feature. In variants, the planar end portion is transversely secured in the male alignment feature, so as for the latter to protrude from the average plane of the planar end portion, on each side thereof.

In embodiments, the male alignment feature comprises a second female alignment feature formed therein, which extends transversally to the planar end portion, so as to receive a second male alignment feature.

In some embodiments, the connecting structure comprises: a connector that comprises said second optical waveguides; and a housing, the latter comprising: third alignment features configured to secure the connector in the housing; and said female alignment feature. The housing is otherwise configured to allow the first optical waveguides to be optically coupled, at said second end, to the second optical waveguides upon insertion of the male alignment feature into the female alignment feature.

In some embodiments, the connector is removably insertable in a cavity of the third alignment features.

Devices embodying the present invention will now be described, by way of non-limiting examples, and in reference to the accompanying drawings.

BRIEF DESCRIPTION OF THE DRAWINGS

FIGS. 10A-12 show components of an optical assembly according to a fourth embodiment, wherein the external connector has protruding alignment features, contrary to the third embodiment (FIGS. 4-9, where the alignment features are recessed). In detail:

FIG. 10A is a cross-sectional view in a plane parallel to the basal plane (x, y) of a connecting structure as used in the assembly of FIG. 12. FIG. 10B depicts the same object, as seen from the right-hand side;

FIG. 12 is a 2D cross-sectional view of the optical assembly according to the fourth embodiment.

Figure 1:
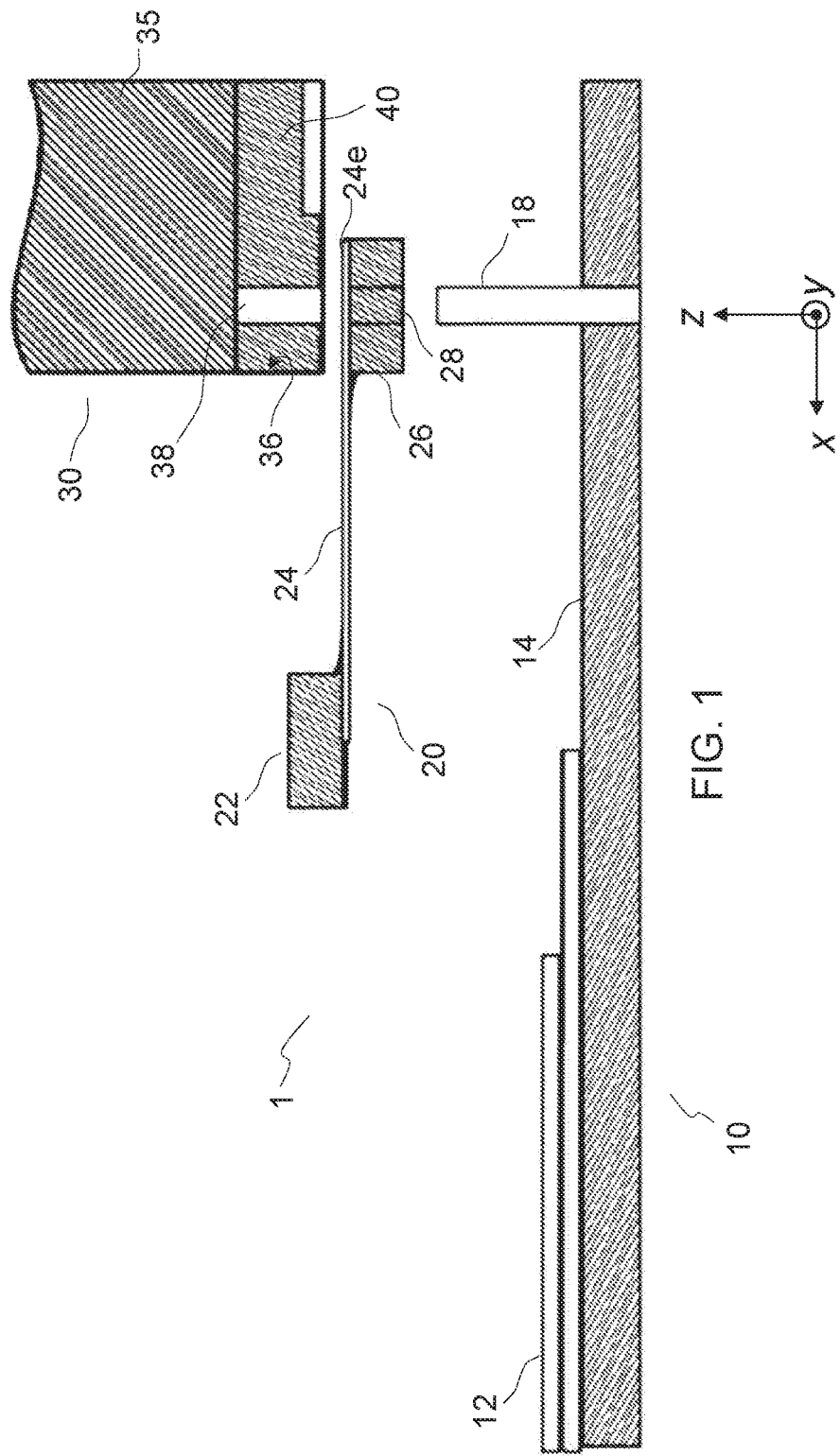
FIG. 1 is a 2D cross-sectional view, in a transverse plane (x, z), of components of an optical assembly (not assembled) according to a first embodiment.

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

DETAILED DESCRIPTION

In reference to FIGS. 1, 2, 9 and 12, aspects of the invention are described, which concern optical assemblies 1, 1a-1c. FIGS. 1 and 2 illustrate a first and a second embodiment, respectively, where, in each case, a connector part 40, 40a is integral with the connecting structure. FIGS. 4-9 pertain to a third embodiment, where the connector part is an external connector, which can be removably inserted in the connecting structure. FIGS. 10A-12 relate to a fourth embodiment, similar to that of FIGS. 4-9, except that the external connector has recessed alignment features. In each case, the optical assembly comprises at least a coupler 20, 20a-20c and a connecting structure, the latter denoted by numeral references 30, 30a-30c, 40, 40a-40c in the appended drawings. In embodiments, the optical assembly may further comprise a substrate 10 with one or more optical devices 12 arranged on or in the substrate.

The coupler 20, 20a-20c basically comprises first optical waveguides 24, 24a, a male alignment feature 26, 26a, 26b and optical connection means 22.

The first optical waveguides 24, 24a extend parallel from a first end to a second end and form a planar end portion 24e at the level of the second end.

The planar end portion 24e is secured to the male alignment feature 26, 26a, 26b. The latter protrudes transversally to the average plane of the planar end portion 24e, at a level of this end portion 24e. The average plane of the planar end portion 24e is parallel to the basal plane (x, y) of the optical assemblies depicted in FIGS. 1, 2, 9 and 12. That is, the end portion 24e extends essentially in a plane parallel to the plane (x, y) subtended by perpendicular directions x and y.

The optical connection means 22 are arranged at the level of the first end of the first waveguides. They are used to optically couple the waveguides 24, 24a to the devices 12 on the substrate 10.

The connecting structure 30, 30a-30c, 40, 40a-40c comprises second optical waveguides 44, which extend parallel to the plane (x, y), at least at the level of an end portion 44e thereof, and a female alignment feature 36. The latter extends transversally to the plane (x, y), at the level of the planar end portion 24e, and is otherwise configured to receive the male alignment feature 26, 26a, 26b, in insertion therein. The section of the male feature 26, 26a, 26b (in a plane parallel to the plane (x, y)) may have a form factor, e.g., rectangular or square, and the female alignment feature 36 can be correspondingly shaped, to prevent rotation about the axis z, perpendicularly to the plane (x, y), wherein x, y and z are perpendicular two by two.

On the one hand, the optical connection means 22 are configured to allow the first optical waveguides 24, 24a to be optically coupled to one or more optical devices 12 (e.g., on the substrate 10) at said first end. On the other hand, the connecting structure 30, 30a-30c, 40, 40a-40c is configured to allow the first optical waveguides 24, 24a to be optically coupled, at said second end, to the second optical waveguides 44 upon insertion of the male alignment feature 26, 26a, 26b into the female alignment feature 36.

The optical connection enabled by the connecting structure 30, 30a-30c, 40, 40a-40c is typically such that each of the first waveguides 24 can be optically coupled to a respective one of the second waveguides 44. A butt-coupling mechanism can be used. However, a suitable optical projection coupling mechanism can also be contemplated. An optical projection coupling denotes any mechanism to couple light from point A to point B, which involves a free space propagation of the optical beam between A and B. This may further include expansion, collimation and focus of the beam. Lenses may thus be needed.

The connecting structure 30, 40 may notably comprise a connector part 40, 40a-c, designed so as to ensure a suitable coupling of the second waveguides 44 to the first waveguides 24, 24a. The connector part 40, 40a-c may be integral with the connecting structure 30, 30a, 40, 40a, as in FIGS. 1 and 2. In variants, the connector part 40b, 40c is removably mounted in the connecting structure 30b, 30c, 40b, 40c (as in FIGS. 9 and 12). In all cases, the connecting structure may comprise a cap 35 (or a lid, or an encapsulant) covering the optical coupling section, i.e., where the first optical waveguides 24, 24a optically couple to the second optical waveguides 44, at the level of said second end.

In embodiments, one or each of the first optical waveguides 24, 24a and the second optical waveguides 44 comprises optical fibers. Such waveguides 24, 24a, 44 may for instance form bundles of fibers or ribbons of optical fibers. Flat ribbons of optical fibers can be used, as assumed in FIG. 8. The flat ribbons may for instance be flexible ribbons, to ease the various connections. In all cases, the first waveguides 24, 24a form a planar end portion 24e. The end portion 44e of the second waveguides can be planar too, to ease the optical coupling.

The optical devices 12 may comprise one or more photonic dies (also referred to as photonic integrated circuits, or PICs), and one or more optical assembly dies, or a combination thereof. An optical assembly die involve a hybrid integrated assembly of two dies, including a purely electrical die together and a purely optical die.

A photonic die is a small block of materials, on which a given functional, optical circuit is fabricated. It typically includes a light emitting photonic element, e.g., affixed to a transparent substrate 10. A photonic element as used herein includes a material or structure that exhibits changes in the refractive index of the material on a length scale that is comparable to the typical optical wavelengths it uses. "Transparent" refers to the property of being substantially transmissive to the light of interest, such as infrared, visible and/or ultra-violet light. A photonic waveguide silicon die shall typically support a number of optical links dedicated to high speed data transmission.

The present solutions ensure an in-plane optical coupling of the two sets 24, 44 of waveguides, while concurrently allowing optical coupling to optical devices 12, e.g., photonic dies, at the other end of the first waveguides 24, 24a. Thus, an external device or light source, coupled to said second waveguides 44, can be optically coupled to optical devices 12 via an optical coupling mechanism 20, 30, 40, whose optical parts remain parallel to the substrate 10 (especially at the level of the optical coupling section), as opposed to out-of-plane coupling solutions. The present solution is therefore more robust (less sensitive to couple exerted on the connector, no optical waveguides need be bent for the purpose of the optical coupling 30, 40) and possibly more compact, compared to out-of-plane coupling solutions.

In particular embodiments such as described below, no fiber need to reach out of the package footprint, and no outside parts are required, which could transfer levering forces to delicate parts of the package.

In addition, the alignment and fixation of the required parts are compatible with standard assembly processes. For instance, such parts can be made of glass to give them a shape that is sufficiently invariant for alignment accuracy, in a temperature range compatible with a co-molding process (50 to 250° C., typically 150° C.). These elements may also have additional interlocking features so as to stay in place in a stable manner during and after co-molding.

Figures 2A, 2B, 2C, 2D:
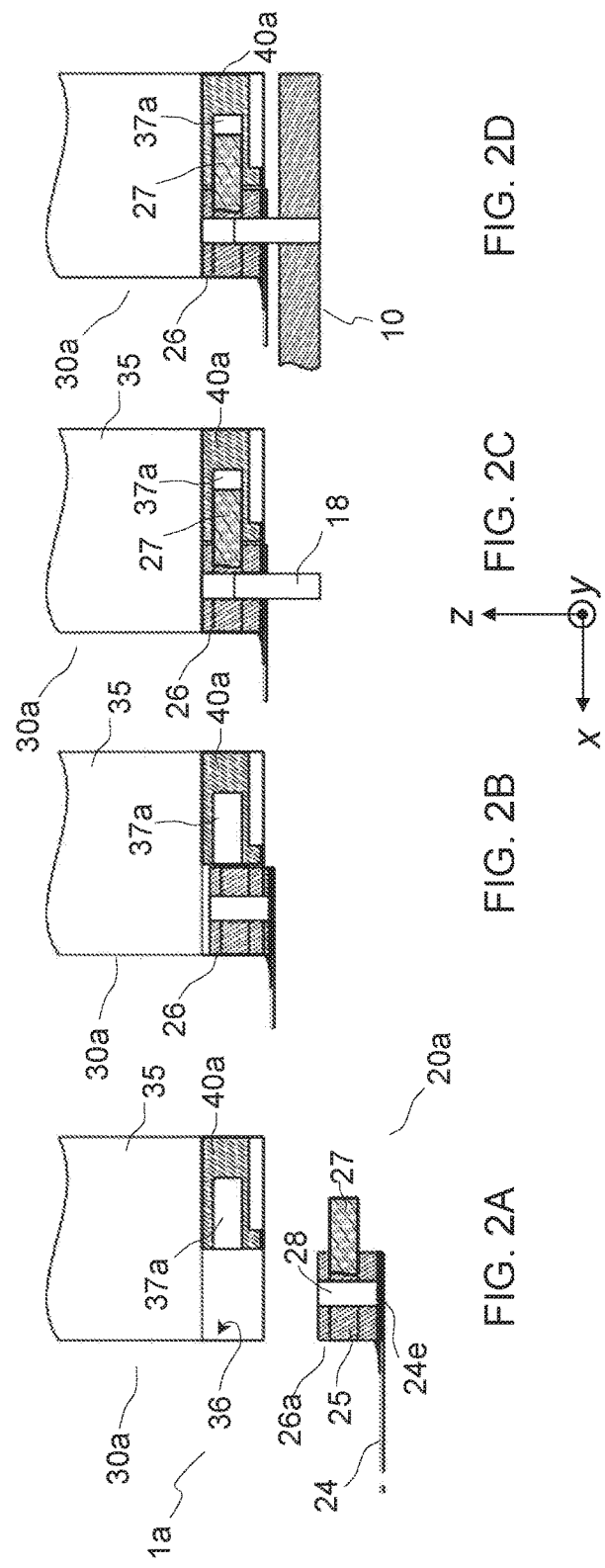
FIGS. 2A-2D show 2D cross-sectional views, in a transverse plane (x, z), of components of an optical assembly according to a second embodiment. The successive views illustrate how an external device or light source, coupled to waveguides in a connecting structure, can be optically coupled to optical devices (e.g., photonic dies) on a substrate, via an optical coupler that is essentially parallel to the substrate.
Figure 3:
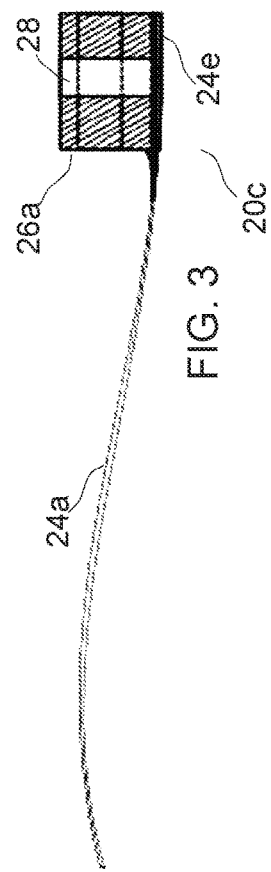
FIG. 3 is a 2D cross-sectional view of a variant to the couplers shown in FIGS. 1, 2, 9 and 12, which involves flexible waveguides, as used in embodiments.
Figure 4A:
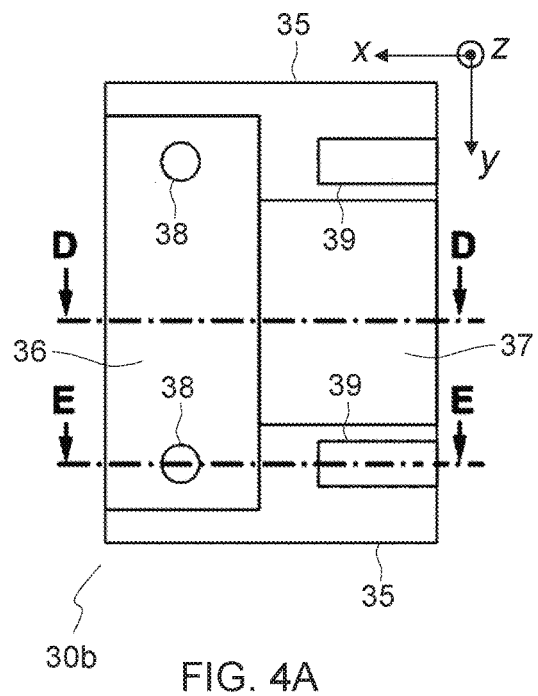
FIG. 4A is a cross-sectional view, in a basal plane (x, y), of a connecting structure as used in the assembly of FIG. 9.
Figure 4B:
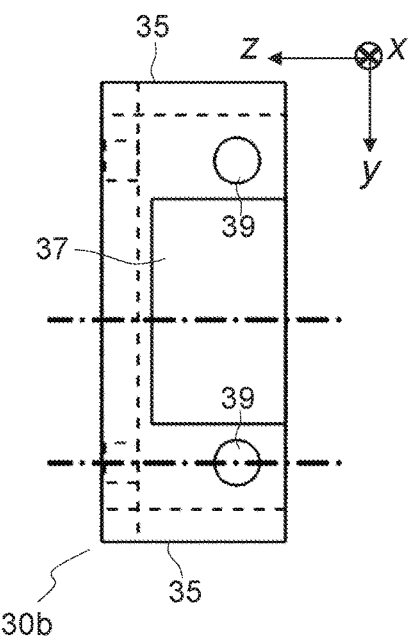
FIG. 4B depicts the same object, as seen from the right-hand side.
Figure 5A:
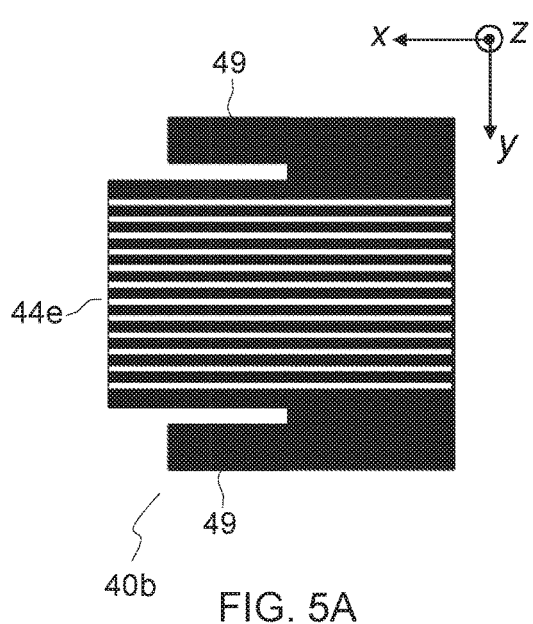
FIG. 5A is a top view, parallel to the plane (x, y), of an external connector, removably insertable in the connecting structure of FIGS. 4A-4B, as used in the assembly of FIG. 9.
Figure 5B:
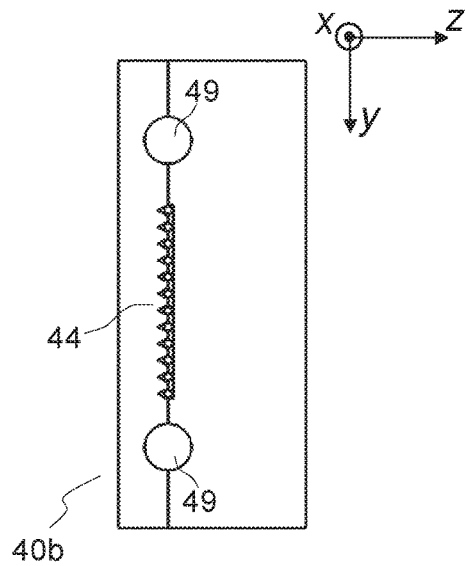
FIG. 5B depicts the same object, as seen from the left-hand side.
Figure 6:
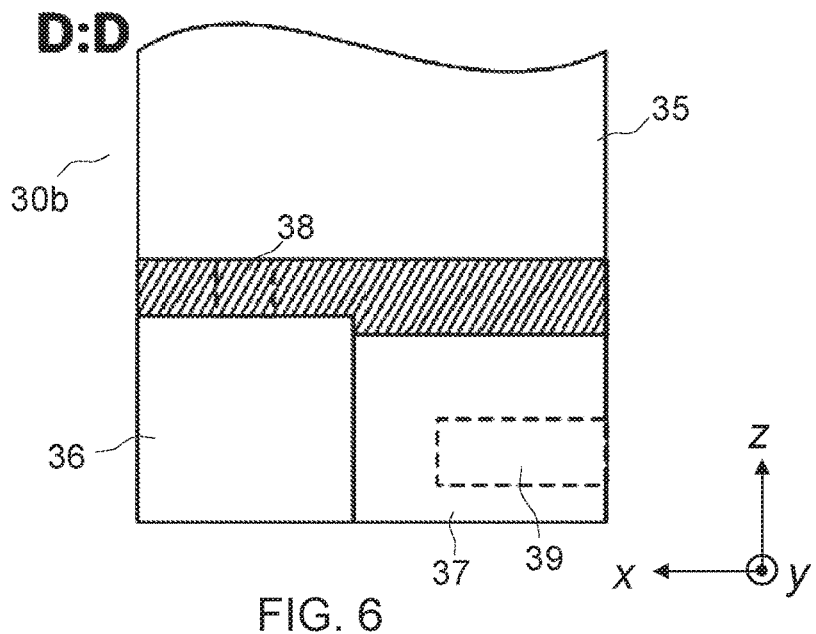
FIG. 6 is a cross-sectional view of the connecting structure of FIG. 4, cut in a transverse plane as identified by the line D-D in FIG. 4.
Figure 7:
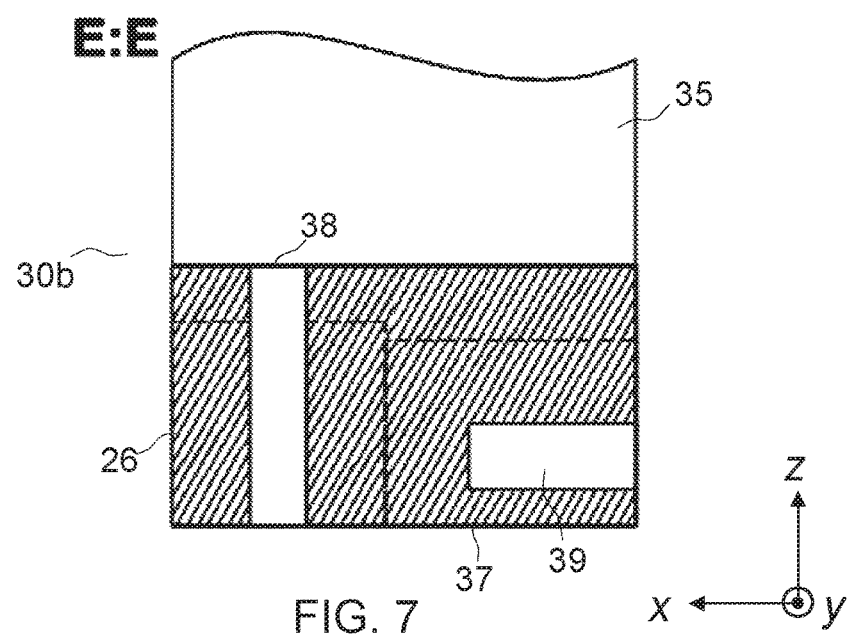
FIG. 7 is another cross-sectional view of the connecting structure of FIG. 4, cut in a transverse plane as identified by the line E-E in FIG. 4.
Figure 8:
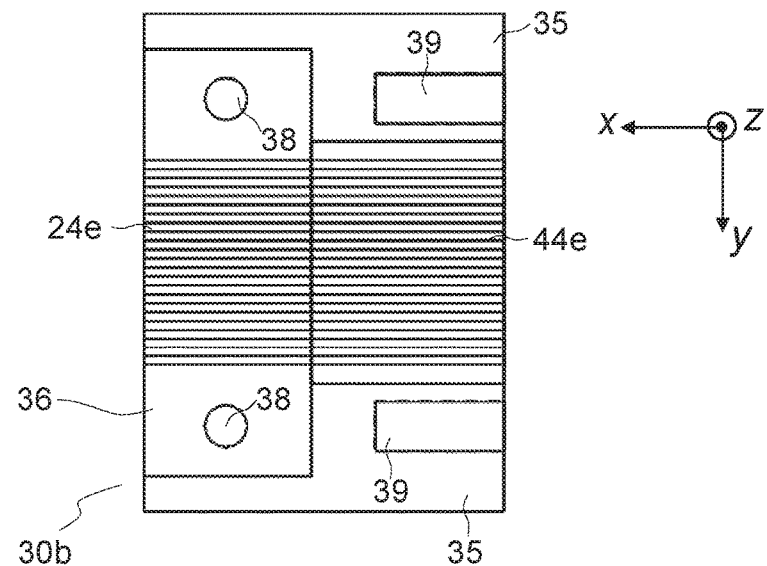
FIG. 8 is a cross-sectional view (parallel to the basal plane (x, y)) of the connecting structure of FIG. 4 with the external connector of FIG. 5 inserted therein, as used in the assembly of FIG. 9.

Referring now to FIGS. 1-3, in embodiments, the planar end portion 24e is fixed to an end surface of the male alignment feature 26, 26a of the coupler 20, 20a, 20c. This makes it easier to fabricate the coupler. If the planar end portion 24e is on top, as in FIG. 1, then the front panel (parallel to plane (y, z)) of the housing of the connecting structure 30, 40 need have an aperture to allow insertion of the waveguides 24 into the cavity 36, when inserting the male feature 26. The optical coupling with the second waveguides 44 takes place within the housing of the structure 30, 40. If the planar end portion 24e is fixed to the bottom of the male element 26a, as in FIGS. 2A-2D, then the optical coupling takes place in a lower portion of the connecting structure 30, 40, or even below this structure 30, 40.

Figure 9:
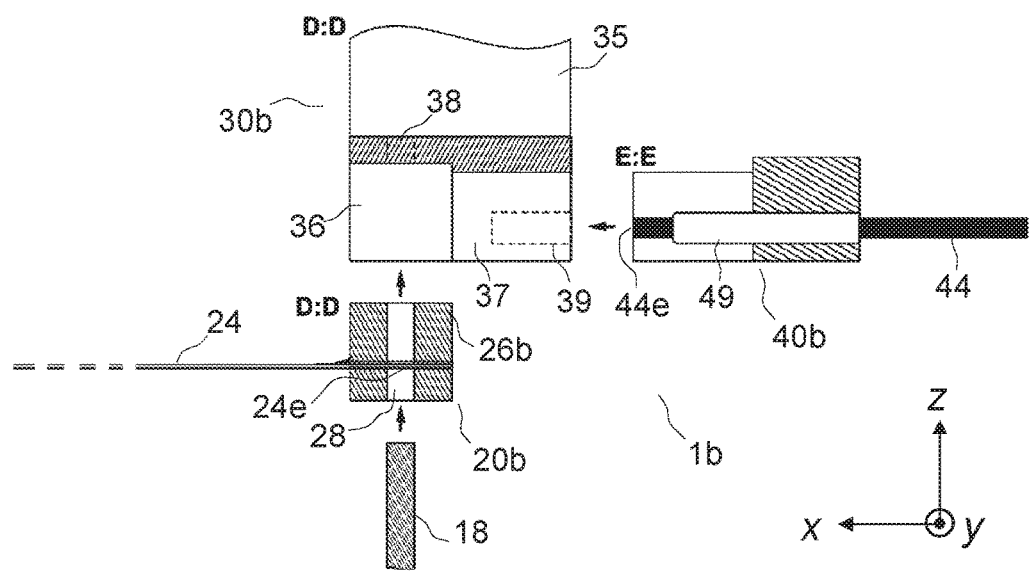
FIG. 9 is a 2D cross-sectional view (parallel to the transverse plane (x, z)) of an optical assembly according to a third embodiment, which involves components depicted in FIGS. 4-8.
Figures 10A, 10B:
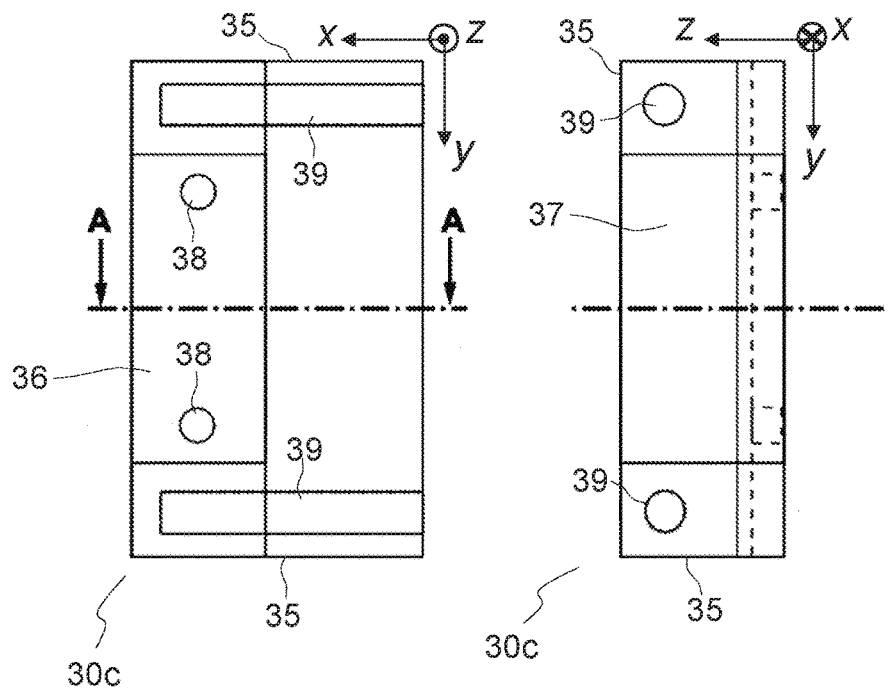

In variants such as depicted in FIG. 9, the planar end portion 24e can be transversely secured in the male alignment feature 26b of the coupler 20b. In that case, the male alignment feature 26b, protrudes from the average plane (parallel to (x, y)) of the planar end portion 24e, on each side thereof. This configuration allows to adjust the level at which the optical coupling between end portions 24e, 44e of the waveguides 24, 44 is realized in the connecting structure 30b. That is, when the male feature 26 is entirely received in the female alignment feature 36, e.g., a cavity 36, the optical coupling between end portions 24e, 44e is achieved at the level of the average plane of the end portions 24e, 44e, within the housing of the connecting structure 30b, 40b, such that the optical coupling obtained can be entirely encapsulated in the connecting structure. A similar configuration of the coupler is used in the embodiment of FIG. 12, which assumes a slightly different design of the connecting structure 30c, 40c. Here too the optical coupling obtained can be entirely encapsulated in the connecting structure.

The design shown in FIG. 1 also allows the optical coupling to be entirely encapsulated in the connecting structure 30, 40. The fabrication of the coupler is facilitated by the fact that the waveguides 24 are fixed to an end surface of the male feature 26. However, the design of FIG. 1 imposes more design constraints on the connecting structure 30, 40, compared with FIG. 9 or 12, inasmuch as the optical coupling is realized at the level of the plane (parallel to (x, y)) separating the parts 30 and 40, such that a relatively deep aperture need be provided on the front panel of the housing of the connecting structure 30, 40, due to the waveguides 24. A similar issue occurs in the designs of FIGS. 9, 12, although the aperture provided on the front panel of the housing need not be as deep as in FIG. 1.

The design assumed in FIG. 2 imposes less design constraints on the connecting structure 30a, 40a than the design of FIG. 1. However, it imposes the optical coupling to take place in a lower section, or even below the housing, making it more exposed and thus less robust than the designs of FIG. 1, 9 or 12.

In reference to FIGS. 2A-2D, the present optical assemblies may, in embodiments, further comprise a male securing feature 27. Meanwhile, female securing features 25, 37a, i.e., cavities, are provided in the first male alignment feature 26, 26a, 26b and the connecting structure. The female securing features 25, 37a extend parallel to the plane (x, y), in vis-à-vis. They are otherwise configured so as for the male securing feature 27 to be able to slide from one 25 of the cavities to the other 37a. This makes it possible to further secure the first male alignment feature 26, 26a, 26b into the first female alignment feature 36 and prevent tilting of the coupler 20a. A similar mechanism can be contemplated in the embodiments of FIG. 1, 9 or 12 (not shown).

Referring now altogether to FIGS. 1, 2, 9 and 12, the male alignment feature 26, 26a, 26b may, in embodiments, comprise a second female alignment feature 28 formed therein, which extends transversally to the plane (x, y) at the level of said planar end portion 24e, so as to receive a second male alignment feature 18. Thus, the male alignment feature 26, 26a, 26b and the female alignment feature 36 shall hereafter conveniently be referred to as the first male alignment feature and the first female alignment feature, respectively. The second female feature 28 allows the coupler 20 to be secured onto a substrate 10, e.g., via a mere pin 18. In turn, the whole assembly 20, 30, 40 can be secured onto that substrate 10. The latter can therefore be regarded as forming part of the optical assembly.

Figure 12:
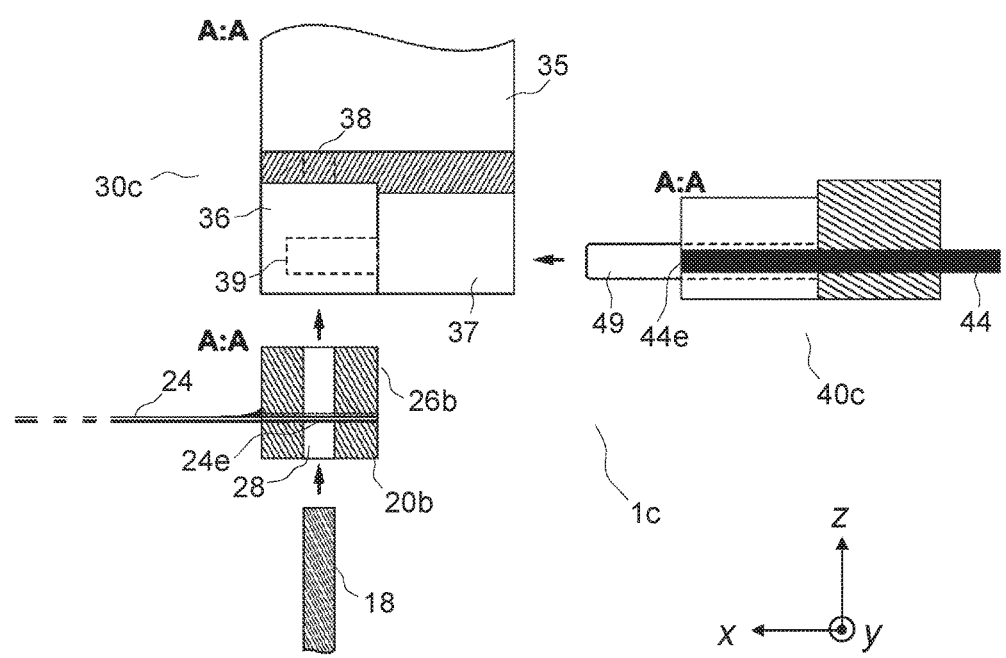

As illustrated in FIGS. 9, 12, the second male alignment feature 18 can be inserted in the second female alignment feature 28, so as for a residual portion of the second male alignment feature 18 to protrude from the first male alignment feature 26b. The connecting structure 30b, 30c, 40b, 40c may thus comprise a residual female alignment feature 38, which is aligned with the second female alignment feature 28, when inserting the first male alignment feature 26b into the female alignment feature 36. The residual female alignment feature 38 can thus receive the residual portion of the second male alignment feature 18, so as to secure the coupler 20b therein (see also FIGS. 4, 6-8, 10A and 10B). A similar residual alignment feature can be contemplated in the embodiments of FIGS. 1 and 2 (not shown).

The optical assemblies 1b, 1c shown in FIGS. 9, 12 rely on connecting structures 30b, 30c 40b, 40c that comprise a connector 40b, 40c (which comprises the waveguides 44) and a housing 30b, 30c. The latter comprises third alignment features 37, 39 configured to secure the connector 40b, 40c in the housing. The connecting structures further comprise a female alignment feature 36, e.g., a cavity, as described earlier. In each case, the housing is designed so as to allow the first optical waveguides 24 to be optically coupled (at the level of the second end of the waveguides 24), to the second optical waveguides 44, when the male alignment feature 26b is inserted into the correspondingly shaped feature 36.

As further shown in FIGS. 9, 12, said third alignment features 37, 39 may notably comprise a cavity 37, which is designed to receive a part of the connector 40b, 40c, in which an end portion 44e of the second optical waveguides 44 is secured.

In the embodiments of FIGS. 9, 12, the connector 40b, 40c is removably insertable in the cavity 37, which provides additional flexibility in the connection. The connector is inserted in the cavity 37 by pushing it parallel to the plane (x, y). On the contrary, the connector part 40, 40*a* used in the embodiments of FIGS. 1 and 2 is integral with the housing 30, 30*a* of the connecting structure.

As further shown in FIGS. 9, 12, the third alignment features 37, 39 may further comprise mechanical connection features 39, to secure the connector 40*b*, 40*c* upon insertion thereof in the cavity 37.

In the example of FIG. 9, the mechanical connection features 39 comprise female alignment features 39 that extend in the housing at the level of the cavity 37, so as to receive corresponding male alignment features 49 of the connector 40*b*. Note that the male alignment features 49 do not protrude beyond the front surface 44*e* of the part of the connector 40*b* that is meant to be inserted in the cavity 37 (see also FIGS. 5A and 5B). Thus, in this embodiment, the female alignment features 39 extend in the housing at the level of the cavity 37 only. They do not need to extend at the level of the cavity 36, since the corresponding alignment features 49 of the connector 40*b* are recessed or, at least, do not protrude from the front surface 44*e*.

Figures 11A, 11B:
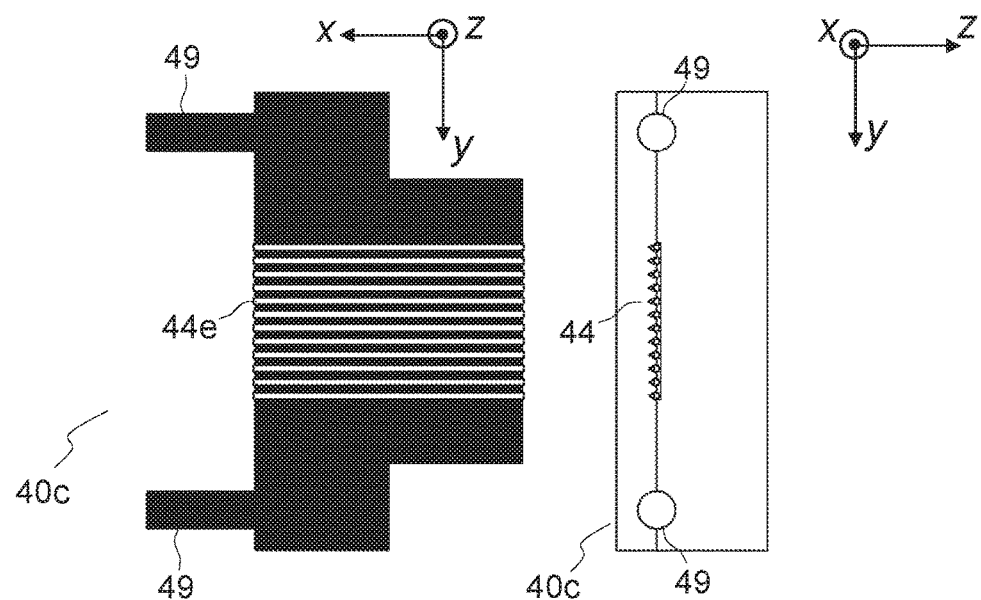
FIG. 11A is a top view (parallel to said basal plane) of the external connector, removably insertable in the connecting structure of FIGS. 10A-10B.
FIG. 11B depicts the same object, as seen from the left-hand side.

In the example of FIG. 12, the female alignment features 39 extend in the housing at the level of the cavity 36, so as to receive the male alignment features 49 of the connector 40*c*, which features 49 protrude from the front surface 44*e* of the connector (see also FIGS. 11A, 11B).

In each of the embodiments described in reference to FIGS. 1, 2, 9 and 12, the substrate 10 may be regarded as forming part of the optical assembly 1, 1*a*-1*c*. The substrate 10 comprises one or more optical devices 12, which may be preassembled on the substrate 10. The first optical waveguides 24, 24*a* are optically coupled to the one or more optical devices 12 at their first end, via any suitable type of optical connection means 22.

As noted earlier, the male alignment feature 26, 26*a*, 26*b* may comprise a second female alignment feature 28 formed therein. The female alignment feature 28 extends transversally to the plane (x, y) at the level of the planar end portion 24*e*, so as to receive a second male alignment feature 18, e.g., a pin. Thus, the first male alignment feature 26, 26*a*, 26*b* can be secured onto the substrate 10 thanks to the male alignment feature 18, which may be integral with the substrate, i.e., fixed thereto.

In embodiments as shown in FIGS. 1, 2, 9 and 12, the connecting structure 30, 30*a*-30*c*, 40, 40*a*-40*c* further comprises a cap 35 (or a lid), which covers the optical coupling section of the connecting structure, i.e., the section where the first optical waveguides 24, 24*a* optically couple, at the level of the second end, to the second optical waveguides 44. The cap 35, or lid, may, together with lower sections of the structure 30, 40, encapsulate all essential mechanical and optical parts of the structure 30, 40, so that no optical waveguides is exposed at the level of the optical coupling.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. An optical assembly, comprising:
   a coupler, having:
      first optical waveguides extending parallel from a first end to a second end and forming a planar end portion at the level of the second end;
      a male alignment feature, to which said planar end portion is secured, the male alignment feature protruding transversally to an average plane of the planar end portion at a level of said planar end portion;
      optical connection means, at said first end; and
   a connecting structure, comprising:
      second optical waveguides extending parallel to said plane; and
      a female alignment feature, configured to receive said male alignment feature, and extending transversally to said plane at the level of the planar end portion;
   wherein the optical connection means are configured to allow the first optical waveguides to be optically coupled to one or more optical devices at said first end;
   wherein the connecting structure is configured to allow the first optical waveguides to be optically coupled, at said second end, to the second optical waveguides upon insertion of the male alignment feature into the female alignment feature.

2. The optical assembly according to claim 1, wherein said planar end portion is fixed to an end surface of the male alignment feature.

3. The optical assembly according to claim 1, wherein said planar end portion is transversely secured in the male alignment feature, so as for the latter to protrude from the average plane of the planar end portion, on each side thereof.

4. The optical assembly according to claim 1, wherein:
   said male alignment feature is a first male alignment feature and said female alignment feature is a first female alignment feature; and
   said first male alignment feature comprises a second female alignment feature formed therein, which extends transversally to said plane at the level of said planar end portion, so as to receive a second male alignment feature.

5. The optical assembly according to claim 4, wherein the connecting structure further comprises:
   the second male alignment feature, the latter inserted in the second female alignment feature, so as for a residual portion of the second male alignment feature to protrude from the first male alignment feature; and
   a residual female alignment feature that is aligned with said second female alignment feature, upon insertion of the first male alignment feature into the first female alignment feature, so as to receive said residual portion of the second male alignment feature.

6. The optical assembly according to claim 1, wherein said connecting structure, comprises:
   a connector that comprises said second optical waveguides; and
   a housing, comprising:
      third alignment features configured to secure the connector in the housing; and said female alignment feature;

wherein the housing is configured to allow the first optical waveguides to be optically coupled, at said second end, to the second optical waveguides upon insertion of the male alignment feature into the female alignment feature.

7. The optical assembly according to claim 6, wherein said third alignment features comprise a cavity configured to receive a part of the connector, in which an end portion of the second optical waveguides is secured.

8. The optical assembly according to claim 7, wherein the connector is configured so as to be removably insertable in the cavity by sliding the connector parallel to said plane.

9. The optical assembly according to claim 8, wherein the third alignment features further comprises mechanical connection features configured to secure the connector inserted in the cavity.

10. The optical assembly according to claim 9, wherein the mechanical connection features comprise female alignment features that extend in the housing at the level of the cavity, so as to receive corresponding male alignment features of the connector, which male alignment features do not protrude beyond a front surface of said part of the connector.

11. The optical assembly according to claim 9, wherein the mechanical connection features comprise female alignment features that extend in the housing at the level of the first female alignment feature, so as to receive corresponding male alignment features of the connector, which male alignment features protrude beyond a front surface of said part of the connector.

12. The optical assembly according to claim 1, further comprising a substrate that comprises said one or more optical devices, wherein the first optical waveguides are optically coupled to the one or more optical devices at said first end, via the optical connection means.

13. The optical assembly according to claim 12, wherein:
said male alignment feature is a first male alignment feature and said female alignment feature is a first female alignment feature; and
said first male alignment feature comprises a second female alignment feature formed therein, which extends transversally to said plane at the level of said planar end portion, so as to receive a second male alignment feature, and wherein the first male alignment feature is secured onto the substrate due to said second male alignment feature.

14. The optical assembly according to claim 1, wherein the connecting structure further comprises a cap, or lid, covering an optical coupling section of the connecting structure where the first optical waveguides optically couple, at said second end, to the second optical waveguides.

15. The optical assembly according to claim 4, wherein:
the assembly further comprises a male securing feature; and female securing features are provided in the first male alignment feature and the connecting structure, said female securing features extending parallel to said plane, in vis-à-vis, and being otherwise configured so as for the male securing feature to be able to slide from one of the female securing features to the other and thereby secure the first male alignment feature in the first female alignment feature.

16. The optical assembly according to claim 1, wherein one or each of the first optical waveguides and the second optical waveguides comprises optical fibers.

17. The optical assembly according to claim 1, wherein one or each of the first optical waveguides and the second optical waveguides comprises optical fibers.

18. The optical assembly according to claim 1, wherein one or each of the first optical waveguides and the second optical waveguides forms a bundle or a ribbon of optical fibers.

19. The optical assembly according to claim 1, wherein one or each of the first optical waveguides and the second optical waveguides forms a flat ribbon of optical fibers, wherein the flat ribbon is a flexible ribbon.

20. The optical assembly according to claim 1, wherein said one or more optical devices comprise one or more of: a photonic die, or photonic integrated circuit; and an optical assembly die.

\* \* \* \* \*